United States Patent
Talius et al.

(10) Patent No.: US 7,761,412 B2
(45) Date of Patent: Jul. 20, 2010

(54) SYNCHRONIZATION MOVE SUPPORT SYSTEMS AND METHODS

(75) Inventors: Tomas Talius, Sammamish, WA (US); Lev Novik, Bellevue, WA (US); Yunxin Wu, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 902 days.

(21) Appl. No.: 11/112,799

(22) Filed: Apr. 22, 2005

(65) Prior Publication Data

US 2006/0242443 A1 Oct. 26, 2006

(51) Int. Cl.
*G06F 7/00* (2006.01)

(52) U.S. Cl. ..................... 707/610; 707/695

(58) Field of Classification Search .............. 707/610, 707/638, 695
See application file for complete search history.

(56) References Cited

U.S. PATENT DOCUMENTS

| | | | |
|---|---|---|---|
| 5,926,816 A * | 7/1999 | Bauer et al. ............ 707/8 |
| 6,202,085 B1 * | 3/2001 | Benson et al. ............ 709/205 |
| 6,389,423 B1 * | 5/2002 | Sakakura ............ 707/10 |
| 6,466,951 B1 * | 10/2002 | Birkler et al. ............ 707/201 |
| 6,549,902 B1 * | 4/2003 | Iwai ............ 707/8 |
| 6,560,655 B1 * | 5/2003 | Grambihler et al. ......... 709/248 |
| 2004/0073560 A1 * | 4/2004 | Edwards ............ 707/100 |
| 2004/0107236 A1 * | 6/2004 | Nakagawa et al. ......... 709/200 |
| 2005/0235074 A1 * | 10/2005 | Serizawa et al. ............ 710/38 |

* cited by examiner

*Primary Examiner*—Charles Rones
*Assistant Examiner*—Yuk Ting Choi
(74) *Attorney, Agent, or Firm*—Workman Nydegger

(57) ABSTRACT

Disclosed are systems and methods pertaining to data synchronization and move handling support. In particular, a move log is maintained that identifies data that has moved in, out, and within a synchronization scope. Furthermore, the log comprises times associated with when data moves in and out of the synchronization scope. Systems and methods can interact easily with the generated and updated move log to facilitate determining data versions and identifying new data that may need to be synchronized.

15 Claims, 14 Drawing Sheets

| PATH HANDLE | MOVE IN TS | MOVE OUT TS | STATUS |
|---|---|---|---|
| 1\2\3 | 0 | 0 | 0 |
| 1\2\3\2 | 100 | 0 | 0 |
| 1\2\3\5 | 100 | 0 | 0 |
| 1\2\4 | 0 | 0 | 0 |

SYNCHRONIZATION MOVE SUPPORT SYSTEMS AND METHODS

TECHNICAL FIELD

The subject invention relates generally to computers and more particularly toward data synchronization.

BACKGROUND

Individuals these days utilize a myriad of computer devices or systems on a regular basis. For example, individuals can have a desktop computer and/or associated file server with which they interact at work. They can also have a laptop computer for working away from the office as well as one or more desktop computers at home. Furthermore, they may have palm-top computers such as a personal digital assistant (PDA), pocket PCs, mobile phones and/or other portable devices they utilize for organizational, communication, and/ or entertainment purposes. It is typically desirous for at least some data to be copied to multiple devices to enable convenient access thereto. For instance, often a user copies files from a desktop computer or file server to a portable computer or device for use while the user is away from their office. The user then likely modifies or adds some new files while away from the office and subsequently needs to copy these files to their desktop computer or file server when they return to the office. Similarly, users may wish to copy pictures or music from one device to another (e.g., computer to MP3 player, digital camera to computer . . . ). Still further yet, users may demand that personal preferences and contacts (e.g., address book) be maintained across all or a subset of their computers. Thus, certain files need to be synchronized across multiple computers or devices.

In its simplest form, synchronization is merely the task of causing designated files from multiple devices or systems to become the same or consistent. Typically, this means that the most up to data file versions are used to copy to a store. This process is automated by two-way, peer-to-peer, synchronization software applications. In particular, upon activation, a synchronization application can detect file changes or additions on a first device and copy or replicate new and/or altered files to a second device communicatively coupled to the first device, for instance via a hardwired or wireless connection. This causes the files on the first device to be synchronized with files on the second device. Synchronization can also be performed remotely by accessing a network having a first device such as desktop computer coupled thereto. A second device such as a second desktop computer or laptop computer can be synchronized with the first device utilizing synchronization software.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns data synchronization and systems and methods supporting synchronization. More specifically, the subject invention pertains to detection and conveyance of information concerning movement of data with respect to a synchronization scope. Such information can be utilized to facilitate synchronization of a plurality of data replicas.

In accordance with an aspect of the invention, a move log can be generated and maintained. Input regarding movement of data units (e.g., items, files, directories . . . ) with respect to a synchronization scope can be received, for example from a move operation or monitor component, and a log component can utilize such information to update a move log. The move log can include but is not limited to including information identifying data or a range (e.g., hierarchy) of data units, timestamps denoting the time data moved into or out of a synchronization scope, and a status or a tombstone field that indicates whether an item has been removed from the synchronization scope.

The move log can be organized as a range within the synchronization scope according to another aspect of the invention. In particular, path handles can be employed to specify the valid bounds of a synchronization scope. This range can subsequently be broken or separated into a multitude of different ranges when data hierarchies, for example, are moved within the scope. Such ranges could later be altered yet again if the data that moved in moves back out of the synchronization scope. Hence, the move log does not need to include an entry for every data unit within the scope.

In accordance with another aspect of the invention, the move log can be employed to aid synchronization. The move log can be efficiently queried to locate newly moved-in data based on the stored times stamps and data identifying ranges. The information provided by the data log can then be utilized to compute or generate logical data versions, which can be employed in conjunction with synchronization systems and methods to identify changes and update replicas or an intermediary store.

According to yet another aspect of the subject invention, systems and methods are disclosed that facilitate updating replicas where moves are involved. Moves can be problematic to standard synchronization mechanisms that transmit data sequentially based on versions or data identifiers. In particular, problems can result where child data is transmitted prior to parent data. The subject invention provides for detection of out of order situations and application of one or more corrective actions, for example by an out of order component.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
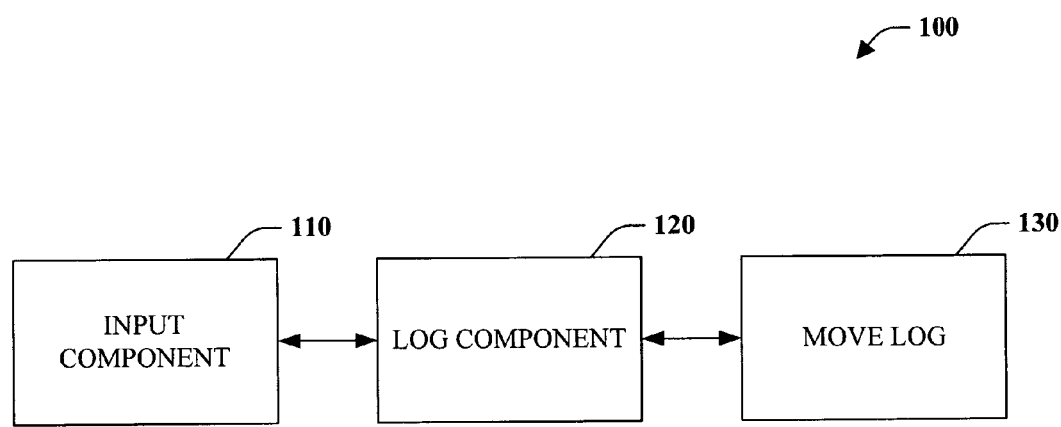
FIG. 1 is a block diagram of a synchronization support system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Artificial intelligence based systems (e.g., explicitly and/or implicitly trained classifiers) can be employed in connection with performing inference and/or probabilistic determinations and/or statistical-based determinations as in accordance with one or more aspects of the subject invention. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Furthermore, the subject invention may be implemented as a method, apparatus, or article of manufacture using standard programming and/or engineering techniques to produce software, firmware, hardware, or any combination thereof to control a computer to implement the disclosed invention. The term "article of manufacture" or "computer program product," as used herein, is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Turning initially to FIG. 1, a synchronization support system 100 is illustrated in accordance with an aspect of the subject invention. System 100 includes an input component 110, log component 120 and a move log 130. Input component 110 receives input or information pertaining to movement of data within a synchronization scope. For example, such information can be received from a move operation or command. A synchronization scope defines a set or range of data on a data store (e.g., computer readable medium, computer program product, database . . . ) that is to be synchronized with at least one other data store. For instance, a synchronization scope can correspond to a designated folder, directory, or other data container such as the "My Documents" folder. The input received by component 110 can include but is not limited to information identifying one or more data items that move into, out of and within a synchronization scope. Such information could also include data or item identifier, old container identifier, new container identifier, and the like. Log component 120 is communicatively coupled to the input component 110. Consequently, input component 110 can transmit received data regarding moves to the log component 120. Log component 120 upon receipt of such information can generate, update, and/or maintain move log or move map 130. The move log or map 130 can be stored electronically on data store including any computer readable medium. Move log 130 can store information regarding movement of data to, from, within and/or amongst synchronization scopes. By way of example, log 130 can house information identifying the moved data as well as the time the data moved and an indication of whether the data is still valid. Furthermore, the log can be representative of the entire range of the synchronization scope, and additions and/or deletions break, consolidate or otherwise manipulate scope ranges.

Data received by the input component 110 and logged in move log 130 can be a group of data and more specifically can be hierarchical data. Accordingly, the move data can be identified using a path or path handle. In such a representation, a sequence of data and/or data containers is identified starting from a root and ending with the particular data unit to be identified. The data sequence is typically delimited by special character such as but not limited to the slash, for example 1\2\3, C:\directory\web\index.htm, and the like. In the example 1\2\3, the root directory is 1 and includes a subdirectory 2, which includes a subdirectory 3.

It should be appreciated that in accordance with alternative terminology, the received input can be received in the form of a "move log" and a "move map" or "move cache" is the output of the log component 120. Unless otherwise indicated by context, the move log described herein is the output of the log component.

Figure 2:
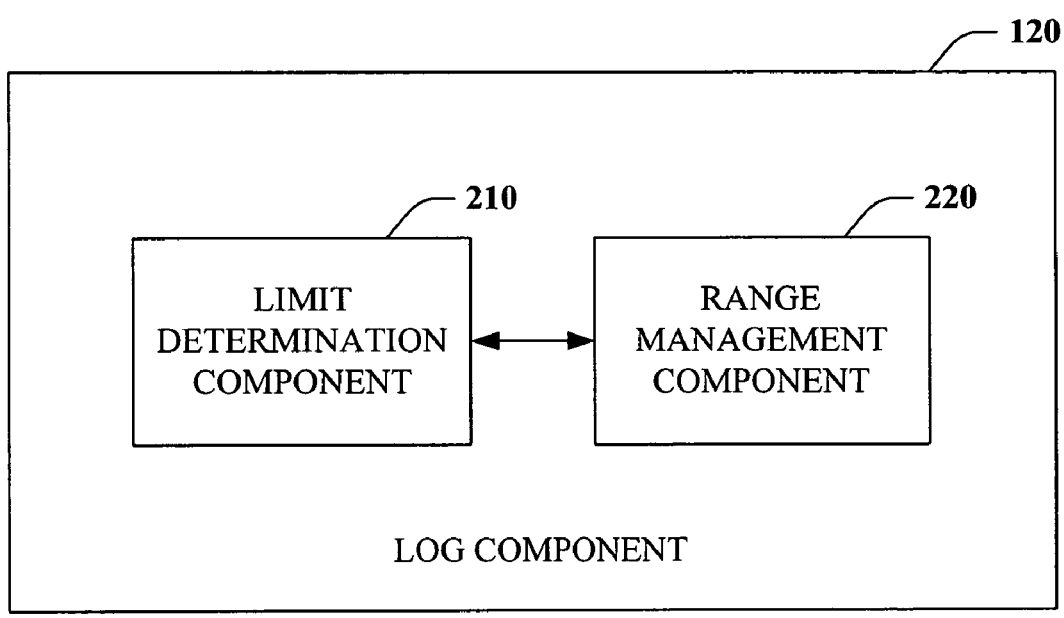
FIG. 2 is a block diagram of a log component in accordance with an aspect of the subject invention.

FIG. 2 illustrates an exemplary log component 120 in accordance with an aspect of the subject invention. Log component 120 includes a limit determination component 210 and a range management component 220. Limit determination component 210 can receive a data identifier such as a path associated with a group of data and determine the limits of the data group. In a simple example, if a hierarchical data group that moves into the synchronization scope is specified by the path 1\2\3\4 then the limit can be determined to be 1\2\3\5. Thus, the group can include all data specified by 1\2\3\4 up to but not including 1\2\3\5. Range management component 220 can organize the move log, for example, to be indexed by data identifier such as path. Moreover, the range management component 220 can ensure that log includes a set of non-overlapping ranges. In essence, the log specifies a range spanning the synchronization scope. Accordingly, there can be an entry that corresponds to the identification of the start and finish of the synchronization scope. Furthermore, upon receipt of a move group, such as from the limit determination component 210, the log can be organized to reflect the range break or division provided by the new move group.

Figure 3A:
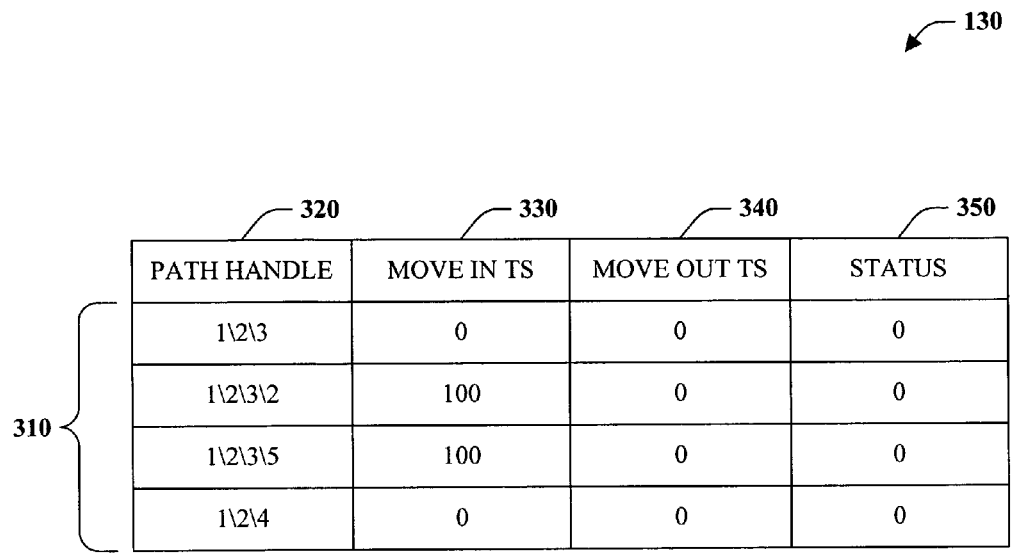
FIG. 3a illustrates an exemplary move log in accordance with an aspect of the subject invention.

FIG. 3a illustrates an exemplary move log or map 130 in accordance with an aspect of subject invention. Move log 130 is presented as a table of records 310. Each record has a path handle 320, a move-in timestamp 330, a move-out timestamp 340 and a status indicator 350. The path handle 320 identifies a particular data item or path thereto. Moreover, combinations of path handles 320 can represent a range of data rather than individual data units. The move-in timestamp 320 specifies the time a data item moved into a synchronization scope. The move-out timestamp 340 specifies a time a data item that was in the synchronization scope moved out of the synchronization scope. A timestamp can be any monotonically increasing number that is incremented periodically (e.g., every millisecond). The timestamp need not correspond to a wall clock time. Status indicator 350 or tombstone indicates whether or not a record and thus data item is valid. If the status indicator 350 is valid, the indicator can be set to one value (e.g., 0). However, if the status indicator 350 is not valid, the indicator can be set to another value (e.g. 1). The status indicator 350 can be set when a specified data item moves out of the synchronization scope that was previously in the scope.

The records 310 together identify synchronization scope or range. Here, the synchronization scope is specified as between 1\2\3 and 1\2\4. Thus, data items or groups thereof can have values such as 1\2\3\4, 1\2\3\10, and 1\2\3\134. In exemplary log 130, the second and third records denote a group of data items that have moved into the synchronization scope. As indicated a group of data defined by the path between 1\2\3\2 and 1\2\3\5 was moved into the synchronization scope at time 100. An additional indicator (not shown) could be utilized to identify single elements rather than the sets provided by this example.

Figure 3B:
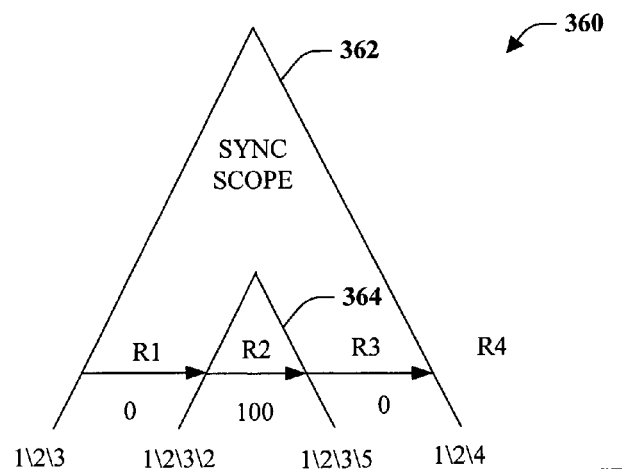
FIG. 3b depicts a synchronization scope diagram in accordance with an aspect of the subject invention.

Turning to FIG. 3b a synchronization scope diagram 360 is illustrated to provide clarity and understanding with respect to aspects of the subject invention. Synchronization scope diagram 360 includes to triangles or trees 362 and 364. The large triangle 362 represents a synchronization scope. The scope is represented as a triangle as it is frequently defined by a hierarchy, although it does not have to be hierarchical. Small triangle 364 represents a group of data moved into the synchronization scope. Again, it is represented as a triangle because often a group data that is moved into the synchronization scope is hierarchical such as a container or folder, but it is not limited thereto. Both the sync scope triangle 362 and the moved triangle 364 can include one more items, files, or other types of discrete data units. As illustrated, the synchronization scope 362 includes a range. In accordance with move log 130 of FIG. 3a, the scope 362 is denoted from 1\2\3 to 1\2\4 for purposes of clarity. Essentially there are two ranges, namely within the scope and outside the scope. With the addition of move triangle 364, the range is broken up. In particular, there is R1 within the scope of 363 and prior to move triangle 364, R2 which corresponds to the added move triangle 364, R3 within the scope of 363 and after R3, and R4 designating the range outside the synch scope 364. R4 could represent a different synchronization scope. Again for purposes of clarity, the start of move triangle is denoted 1\2\3\2 and the end or limit 1\2\3\5 corresponding to the log 130. Furthermore, the move times are specified 0 and 100. Synchronization scope diagram 360 illustrates graphically what the move log 130 documents. Accordingly, it should be plain to see how the move log maintains a set or range of non-overlapping path handles or identifiers. As will be described in further detail in later sections, the organization and maintenance of the move log can facilitate efficient identification of move versions and ultimately the identification of a set of path ranges that include newly move items. Expeditious access to such information is important to synchronization systems and methods.

FIGS. 4a-4f illustrate exemplary move scenarios provided to facilitate understanding of aspects of the subject invention. Each scenario is presented graphically as the interaction of two or more triangles. These triangles represent synchronization scope and move scope or range. Typically, the large triangle represents the synchronization scope and the smaller triangle(s) represent moved groups of data. Furthermore, dashed lines are employed to indicate the location of a triangle prior to a move. The arrow denotes the move of a triangle from a first location to a second location. Triangles or trees are utilized at least in part because synchronization scope and move scopes are often hierarchical. However, it should be appreciated that the invention is not so limited. Both the synchronization scope and the move scope capture groups of discrete data units such as items and files. Their organization does not need to be hierarchical.

Figure 4A:
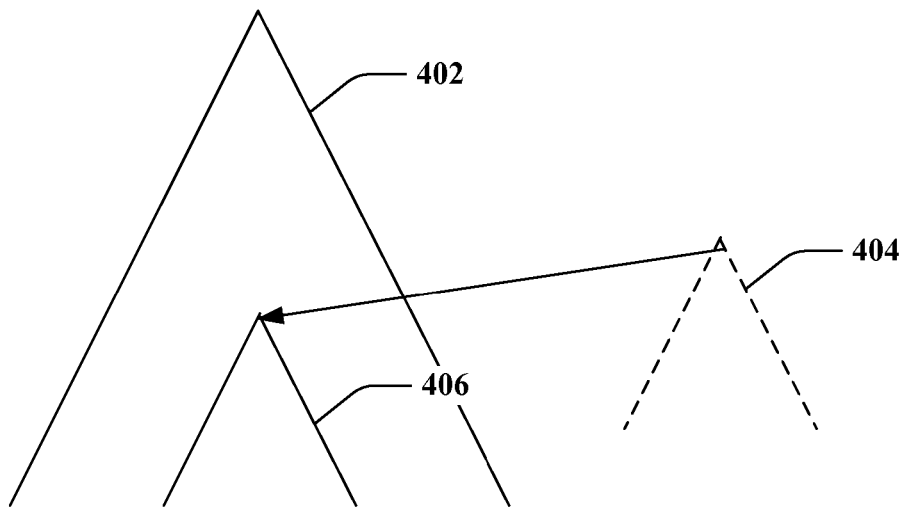
FIGS. 4a-4f illustrate exemplary move scenarios in accordance with aspects of the subject invention.
Figure 4B:
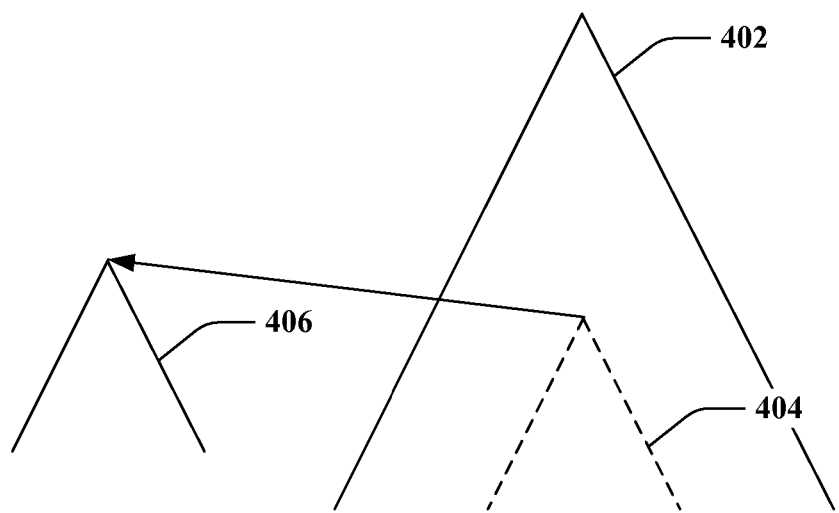

FIGS. 4a and 4b illustrate typical move-in and move-out situations. FIG. 4a depicts a case where a group or hierarchy, the small triangle 406, is moved in to a synchronization scope, the large triangle. The dashed lines show where a tree or triangle was located prior to the move 404. The arrow indicates the direction of the move within the synchronization scope. This is similar to the case described with respect to FIG. 3b. Accordingly, a move log can be modified to include the range of the moved-in tree or triangle 406. Specifically, a record can be added for the start of the hierarchy and a record can be added for the limit of the hierarchy. Further yet, the records can reflect the move in time. FIG. 4b illustrates a move out scenario. Here, the tree that was previously moved-in 404 is moved out 406 of the synchronization scope. Again, the dashed lines illustrate where the tree was while the arrow points to where the tree ends up after the move 406. The move log can document this by writing the status indicator or tombstone to indicate that the item has been removed or deleted from the scope and marking the time of the move.

Figure 4C:
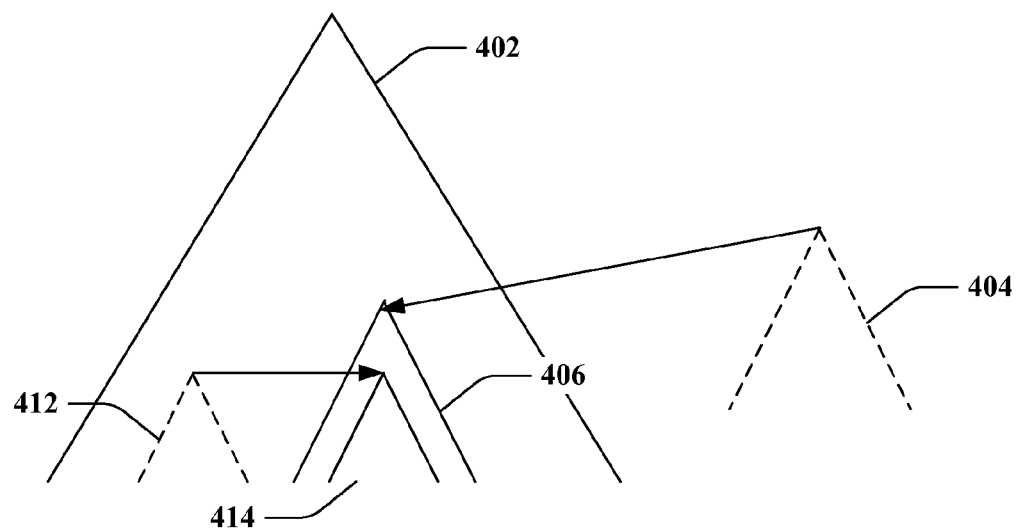
Figure 4D:
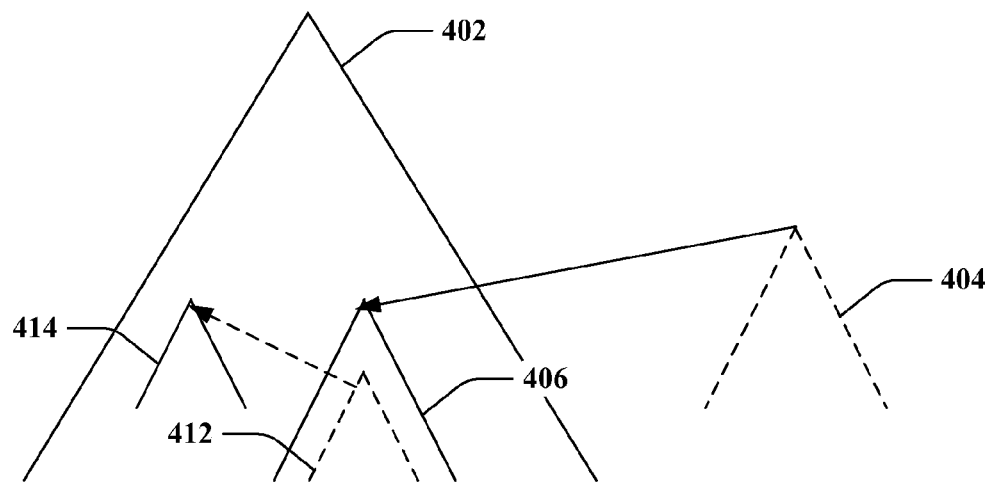

FIG. 4c illustrates a case where a tree prior to move 404 is moved into the scope 402 and then a non-moved in tree prior to move 412 moves at 414 into the newly moved in tree 406. Here, like in the move in case of FIG. 4a, the move log can be updated to reflect the moved-in triangle by adding records corresponding to the beginning and end of the move in range, for example. The move log does not need to be modified for the secondary move of the small triangle 414 into the moved-in triangle 406, as it did not move in or out of the scope and previously existed. The move-in version for the smallest sub-tree is simply their creation versions. FIG. 4d illustrates case where there is a secondary hop or move after move in. Here, a triangle 404 is moved into the synchronization scope 402 that includes or encompasses a previously existing sub-tree 412. Later the sub-tree moves out 414 from under the hierarchy of the moved-in tree 406. The move-in versions of the smaller move tree 414 can stay the same as the ones in the bigger move 406 tree prior to their movement.

Figure 4E:
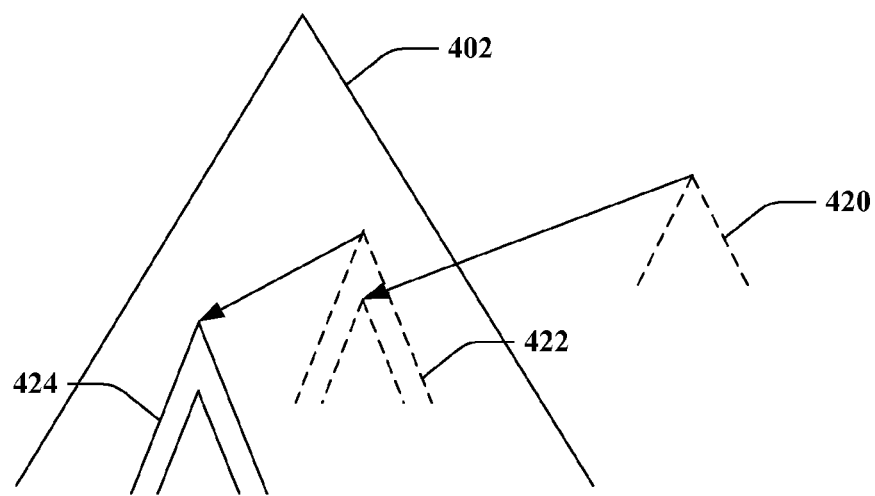
Figure 4F:
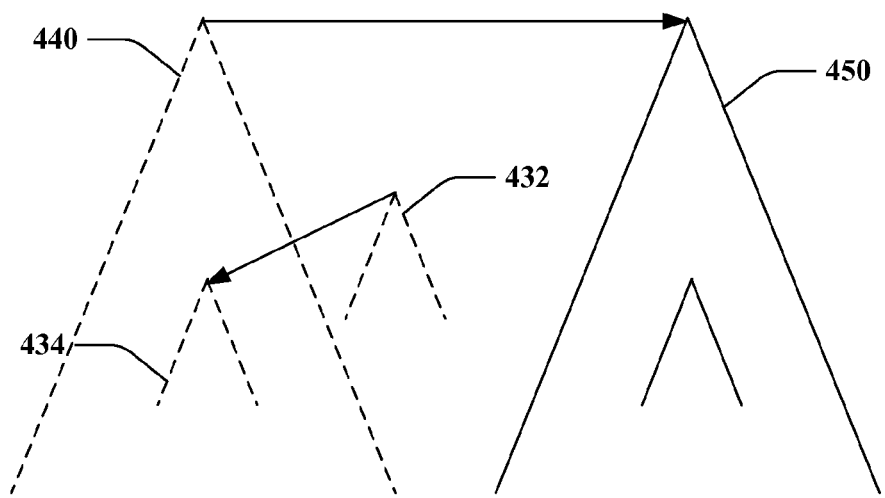

FIGS. 4e and 4f illustrate scenarios where the path handles or ranges need to be updated to reflect moves within the synchronization scope. FIG. 4e illustrates a bigger tree hop situation. In this instance, a tree 420 is moved into a larger preexisting tree 422. The move log can capture this move as it does most move-ins including a record defining the scope of the moved-in tree. Later, the large tree 422, which contains the moved-in tree 420, is itself moved to 424 within the synchronization scope. In this case, the path handles or other identifiers in the move log need to be updated to reflect intra-scope movement. The version(s) can remain the same. FIG. 4f depicts a scope move scenario similar to FIG. 4e. Here, a data hierarchy or tree 432 is moved into the scope tree 440 and subsequently the entire scope tree moves to 450. Again, in this case the move-in records will need to be amended to reflect the range or path handle movement.

It should be appreciated that the exemplary scenarios were presented for clarity and not limitation. Accordingly, additional scenarios are contemplated including, inter alia, a combination of the cases provide supra.

Figure 5:
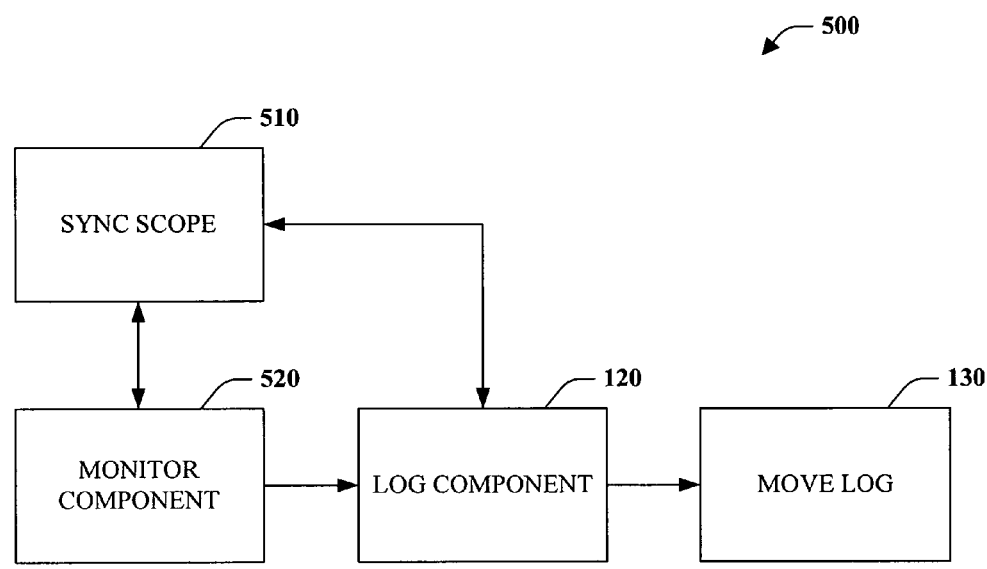
FIG. 5 is a block diagram illustrating a synchronization system in accordance with an aspect of the subject invention.

Turning to FIG. 5, a synchronization system 500 is illustrated in accordance with an aspect of the subject invention. System 500 includes a synchronization scope 510, a monitor component 520, a log component 120 and a move log 130. The synchronization scope 510 defines a set of data on a data store that is to be synchronized with at least one other data store. The synchronization scope 510 can also define a group or location on a data store that is designated for storing or at least identifying data to be synchronized. For example, a synchronization scope 510 can correspond to a designated folder, directory, or other data container such as the "My Documents" folder. The monitor component 510 monitors or observes the synchronization component and detects movement therein. For example, monitor component 520 can detect data that is moved into the synchronization scope 510, data that is moved out of the scope 510 and data that is moved within the scope 510. Upon detection, monitor component 520 can generate a timestamp to identify the time a movement was detected, and pass the timestamp as well as move information that, among other things, identifies the moved data or set of data to the log component 120. Upon receipt of such move information, log component 120 can generate a move log 130, if not already created, and update the log utilizing the received move information. For example, the log component 120 can insert one or more records that identify new data that was moved into the synchronization scope 510. Alternatively, the log component 120 can mark the status or tombstone to indicate that data was been moved out of the sync scope 510 or modify path handles identifying data if it has moved within the scope 510.

Figure 6:
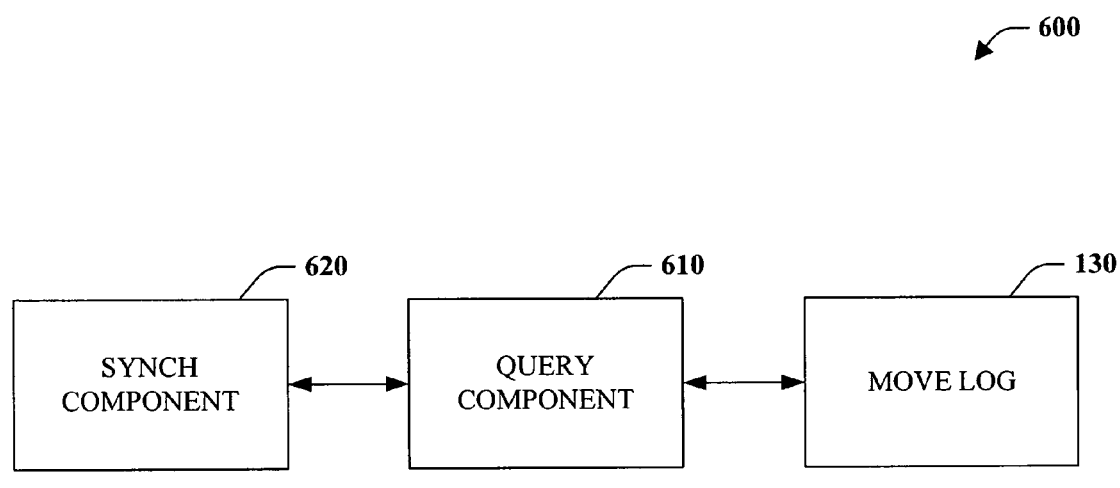
FIG. 6 is a block diagram of a synchronization system in accordance with an aspect of the subject invention.

FIG. 6 illustrates a synchronization system 600 in accordance with an aspect of the invention. System 600 can include a query component 610 and a move log 130. As described supra, the move log 130 can include information pertaining to movement of data relative to a synchronization scope. Among other things, move log 130 can identify moved data, for example via path handles, and log either the time that the data moved in or the time the data moved out of the synchronization scope. Query component 610 is operable to receive queries and retrieve results from the move log 130. For instance, the query component 610 could request and receive data that moved in or out of the synchronization scope and the move-in or move-out timestamp associated therewith. One component that could provide such requests to the query component 610 could be a synchronization component 620.

The synchronization component 620 can be responsible for generating knowledge for a replica and/or transmitting copies of data to other replicas or an intermediary. Hence, synchronization component 620 could desire to quickly identify and/or retrieve move-in or move-out data and timestamps thereof. The timestamps can be employed to generate logical creation and update versions associated with moved data. The logical creation version can be derived from a data unit or item creation version in the store, namely the timestamp generated when the items was created in the store, and its move-in version, specifically the timestamp provided when an item crossed the synchronization boundary from outside to inside. The update version of a data unit or item can be derived from the last update version on the store and the move-out version, namely the timestamp created when the item crossed the synchronization scope boundary from inside to outside. This versioning information can be utilized to facilitated synchronization. For example, the synchronization component 620 could receive information that a replica B has knowledge twenty of another replica A, meaning it knows of all the changes up to version twenty of replica A. The synchronization component 620 could then query the move log 130 through query component 510 to determine if and return any new data items where moved in which are not reflected in by replica B's knowledge of A, for instance where the version or timestamp is greater than twenty. Such data could be identified as new to replica B and a transfer of the new items initiated thereto.

Figure 7:
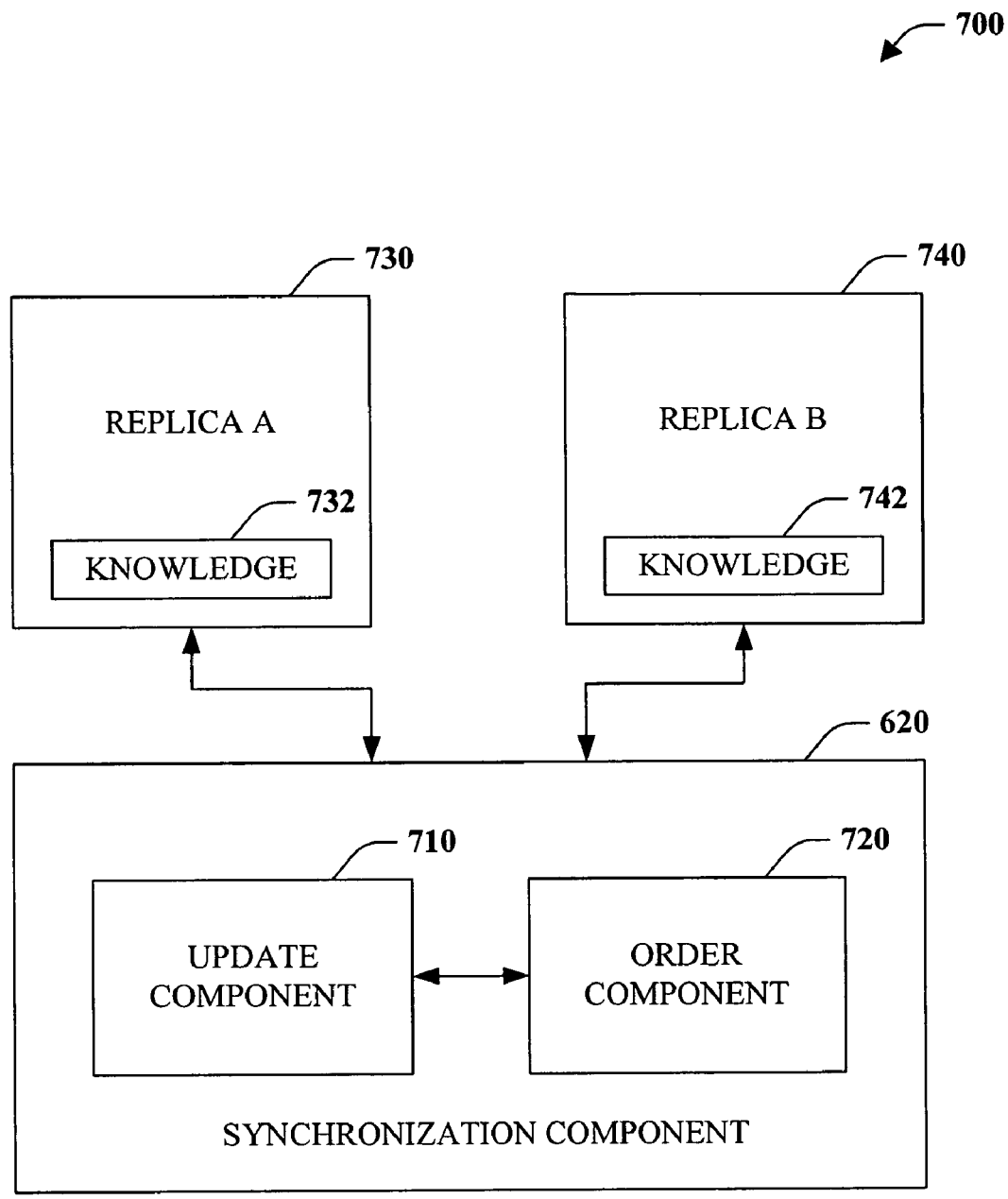
FIG. 7 is a block diagram of a synchronization system in accordance with an aspect of the subject invention.

FIG. 7 illustrates a synchronization system 700 in accordance with an aspect of the subject invention. System 700 includes a synchronization component 620 including an update component 710 and an order component 720. Update component 710 synchronizes two replicas such as replica A 730 and replica B 740. Knowledge 732 and 742 are associated with replicas A 730 and B 740, respectively. Knowledge indicates the changes of which each replica is aware. Accordingly, analysis of knowledge can determine whether synchronization is necessary, for example if knowledge 742 of replica B 740 is less than the knowledge 732 of replica A 730. In this instance, synchronization component 620 via update component 710 can copy changed items or data units from the replica A 730 to replica B 740 to bring replica B 740 up to date. It should be mentioned that each item or data unit upon creation receives an immutable id. Typically, update component 710 transmits changed items or data units to the other replica(s) sequentially from by creation id from smallest to largest. In this manner, it is easy to update knowledge incrementally upon receipt of data and recover from failure should the system crash during synchronization.

However, moving, among other things, can be problematic for such a system. Generally, a parent is created prior to its children. Accordingly, a parent always has a smaller creation id than its children, and parents are thus transmitted to a replica prior to its children. This may not be the case with moved items or data units as they may have been created prior to the parent, which they are later made dependent. This is problematic because it would not be proper to transmit a child prior to the parent, as the replica would not be updated properly. For example, this could correspond to transmitting items that reside in a folder to the replica prior to the folder. Once they arrive, they would not be able to be synchronized properly as the folder or path thereto does not exist. Order component 720 can be employed to deal with this quagmire in one of many ways. For example, order component could add, append or otherwise utilize another number such as a globally unique identifier in conjunction with the logical creation id, for instance, to ensure that the children have a larger number than the parents. Alternatively, order component 720 can assist update component 720 in transmitting items or data items in a proper order. For example, update component 710 could retrieve all items and/or item ids to be transmitted. Then either update component 720 or order component 720 can generate a tree or the like in memory specifying item dependencies. The order component 720 could detect out of order items and suggest a new order for transmission of items by update component 710.

It should be appreciated that a replica may need to implement more complex knowledge updating and maintenance if items are sent out of order to facilitate recovery in the case of a failure or crash during synchronization. In the standard case, items or item changes are received sequentially. Thus, once I1 has been received knowledge can be updated to reflect this. Once, I2 is received the knowledge can then be updated to reflect its receipt. However, in this simplistic example if I4 is received next, then knowledge should not yet be updated to reflect this fact until I3 is received. If the knowledge were to be updated to reflect the fact that it had received I4 and the system crashed, then synchronization may proceed with transmission of I5 and miss the transmission of I3. However, the synchronization component 620 could be designed to detect this situation and properly send I3. For example, inferences can be made or artificial intelligence based systems can be employed to detect and correct such out of order situations.

The aforementioned systems have been described with respect to the interaction between several components. Furthermore, for purposes of clarity and simplicity a number of systems were provided and described to emphasize an aspect of the subject invention. It should be appreciated that such systems can include those components specified therein, some of the specified components, and/or additional components specified in other systems. Additionally, it should be noted that one or more components can be combined into a single component providing aggregate functionality or divided into several sub components. The components may also interact with one or more other components not specifically described herein but known by those of skill in the art.

Figure 8:
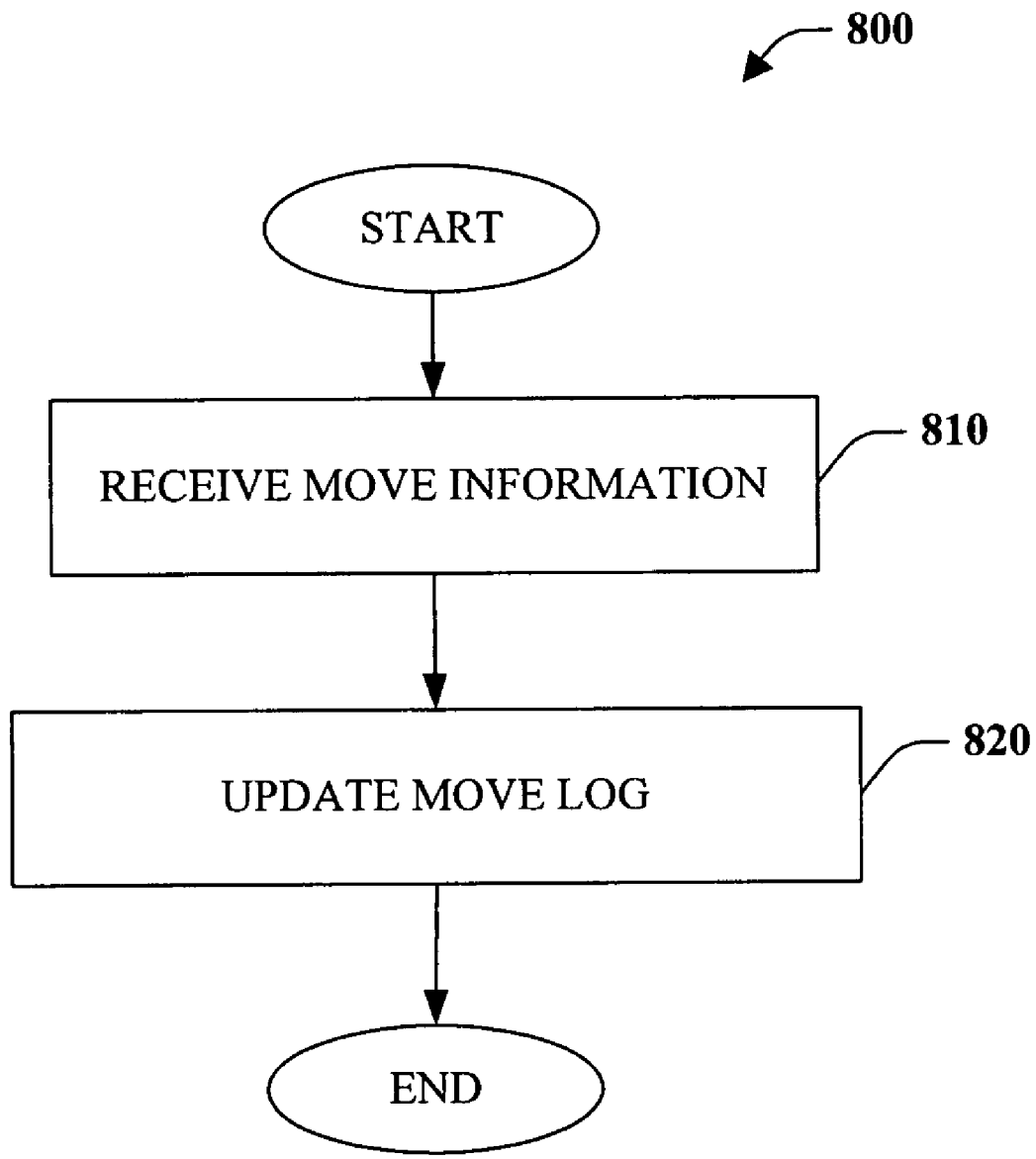
FIG. 8 is a flow chart diagram of synchronization support methodology in accordance with an aspect of the subject invention.
Figure 9:
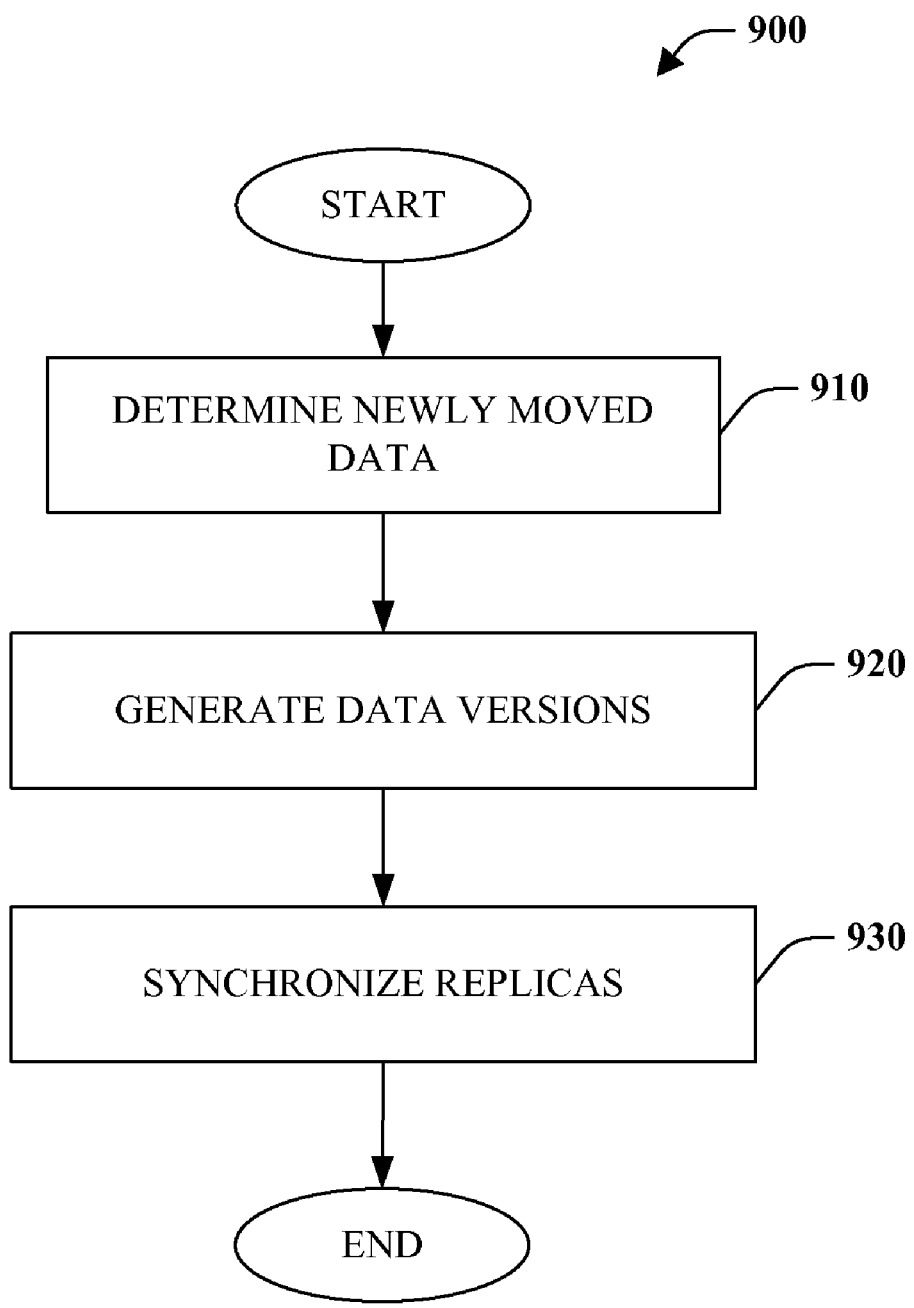
FIG. 9 is a flow chart diagram of a synchronization methodology in accordance with an aspect of the subject invention.
Figure 10:
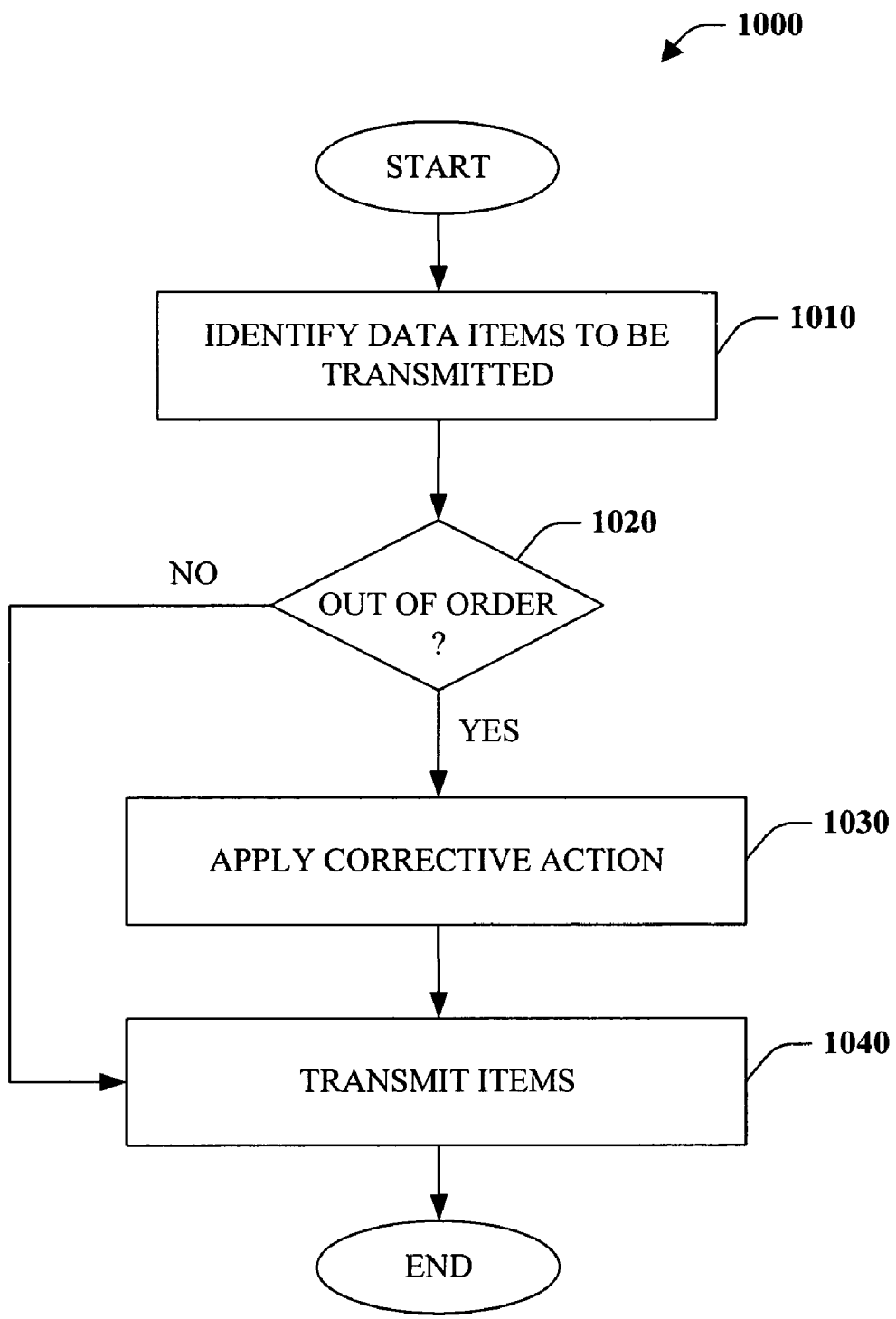
FIG. 10 is a flow chart diagram of a synchronization method in accordance with an aspect of the subject invention.

In view of the exemplary systems described supra, methodologies that may be implemented in accordance with the present invention will be better appreciated with reference to the flow charts of FIGS. 8-10. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 8, a method 800 is depicted for supporting synchronization. At 810, move information is received. Move information is data concerning the movement of one or more data units (e.g., items, files, directories, containers . . . ) relative to a synchronization scope. For example, such data can be received from a monitor that is observing the synchronization scope or from a move operation specifying a particular move. The information can identify data moved with respect to the synchronization scope. For example, it can include one or more path handles identifying a single data unit or a set of data. The information can also include a time or timestamp corresponding to a move. Still further yet, the information may specify one or more item ids, old container ids, new container ids, and the like. At 810, a move log or map can be updated to include move information. If the move log was not created, it can first be created and then updated. The move log can maintain a range of data within the defined synchronization scope. When data moves into the synch scope, identifying information as well as the time of the move can be entered into the move log.

By way of example, consider a move log that includes two records identifying the range of the synchronization scope. A move operation is then executed that causes a hierarchical group of data to be moved into the synchronization scope. Accordingly, data can be received regarding this move by some means or mechanism including but not limited to a timestamp corresponding to the move as well as information regarding the range of data moved in. This range can be specified by a path, for instance 1\2\3-\1\2\4. The range information can then be added to the move log as well as the timestamp. Thus, the move log can specify the entire synchronization scope including the newly moved-in data hierarchy. If data that previously moved into the synchronization scope later moves within the synchronization scope, the identifying ranges can be modified to reflect the movement. If data that previously moved into the synchronization scope subsequently moves out of the synchronization scope, the time of the move out operation can be stored in the log and the status indicator or tombstone can be written to indicate that the data moved out of the scope.

FIG. 9 illustrates a synchronization method 900 in accordance with an aspect of the subject invention. At 910, newly moved data is identified. Such data can be identified by referencing the move-in times stored in a move log or map. At 920, data versions are generated from the identified newly moved data. This is done at least to translate the moved-in data items physical creation date or version on a store into a logical version that reflects the move. Thus, each data unit in a group, for instance, can have a specific creation version but when they are moved, they receive a logical creation version based in part on the time they moved into the synchronization scope. In accordance with an aspect of the invention, each synchronization data unit identity includes a logical creation version. The creation version pertains to a particular synchronization scope. Such a version can be derived from a unit creation version in the store, namely the time corresponding to when the unit was created, and the move-in version, that is, the time the item crossed the synchronization boundary from outside to inside. A data item can also be associated with an update version that can be derived from the units last update version and its move-out version, which corresponds to the time the unit, crossed the synchronization scope boundary from inside to outside. The generated versions can then be employed at 930 to synchronize the replicas. For example, the knowledge indicator can be updated utilizing the generated versions and such knowledge can be compared to the knowledge of other replicas. If knowledge of the other replica does not include the newly moved data, then such information can be transmitted to the other replica to enable it to modify its data to correspond in a manner that includes the changes.

FIG. 10 depicts a synchronization methodology 1000 in accordance with an aspect of the subject invention. As previously described, synchronization of data includes transmission of the data items sequentially. In particular, item identifiers or versions numbers serve as the basis for the ordered transmission of data. However, move operations and particularly move in operations can cause problems with such a transmission based on their item identification and version information. In particular, it is possible that a child item be transmitted before a parent item is transmitted which is problematic with respect to updating a data store on the receiving side of a synchronization. Methodology 1000 provides a process for dealing with such situations. At 1010, data items to be transmitted are identified. At 1020, a check is made of the identified items to determine if any of them are out of order. For example, a tree can be built in memory to facilitate analysis of item dependencies. It should be appreciated that additional items may need to be retrieved beyond those to be transmitted to present an accurate view of items dependencies. If at 1020 it is determined that there are no out-of-order items, then the items can simply be transmitted at 1040 to a designated replica or intermediary store. However, if at 1020 it is determined that at least one item is out of order then the method proceeds to 1030. At 1030, a corrective action can be applied. For example, the transmission can be reordered to ensure that parent items are transmitted prior to transmitting children of respective parents.

Figure 11:
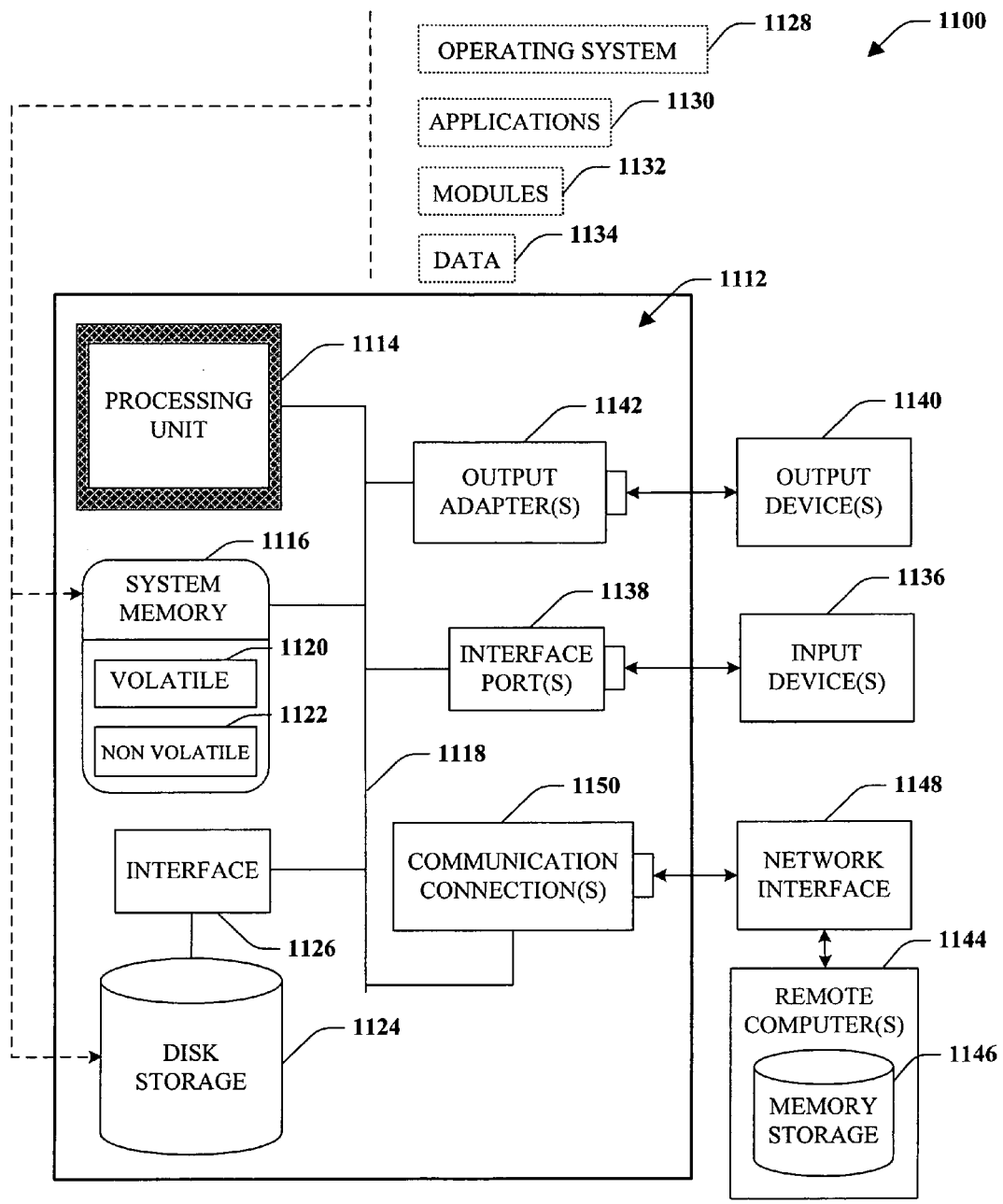
FIG. 11 is a schematic block diagram illustrating a suitable operating environment in accordance with an aspect of the subject invention.
Figure 12:
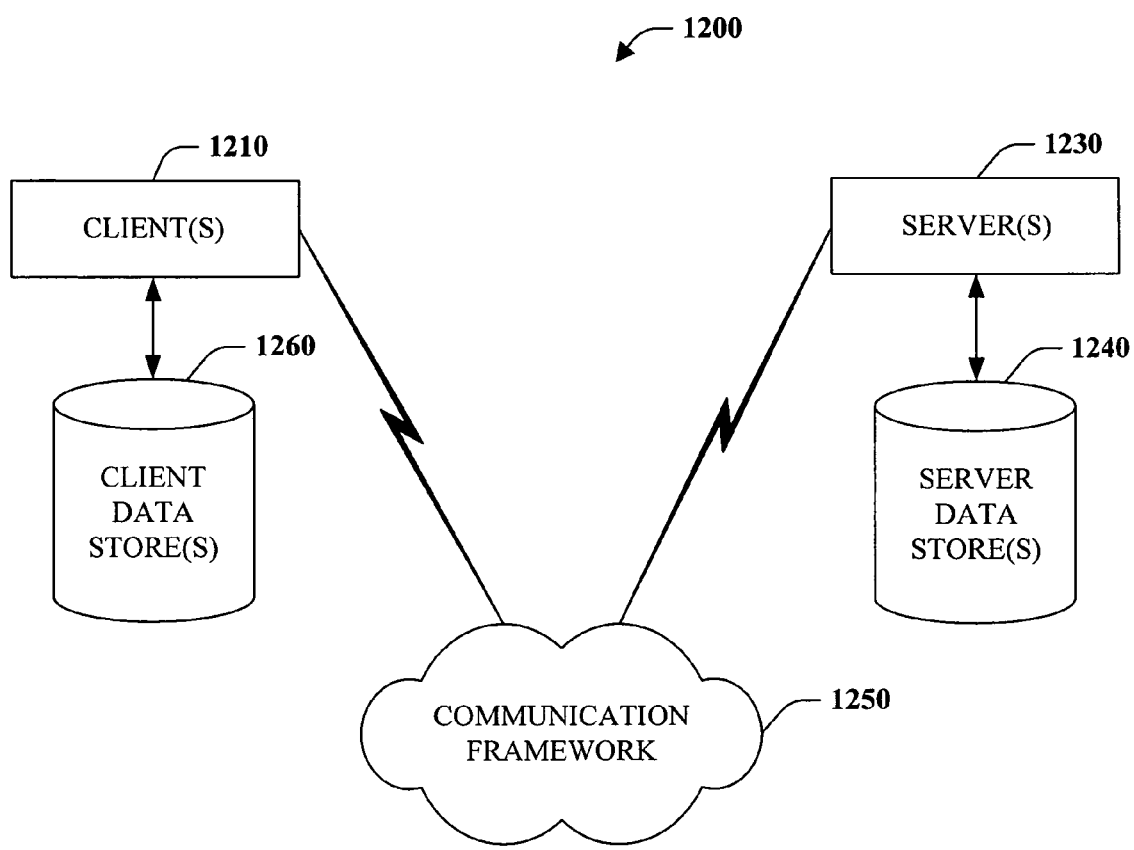
FIG. 12 is a schematic block diagram of a sample-computing environment with which the subject invention can interact.

In order to provide a context for the various aspects of the invention, FIGS. 11 and 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example disk storage 1124. Disk storage 4124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The server(s) 1230 can house threads to perform transformations by employing the present invention, for example. One possible communication between a client 1210 and a server 1230 may be in the form of a data packet transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A data store synchronization support system which facilitates the synchronization of a plurality of data replicas comprising:

a processor operatively coupled to memory that stores computer executable instructions, wherein the processor executes the instructions to implement the following components:

an input component that receives input that specifies movement of data or a collection of data, to, from or within a synchronization scope of a data store;

a log component that updates a move log, that identifies data subject to synchronization, with information that identifies the moved data, a time of move, and a type of move, wherein the information includes a move in timestamp for the moved data if the data is moved in to the synchronization scope, or includes a move out timestamp for the moved data if the data is moved out of the synchronization scope;

a synchronization component that uses the move log to quickly identify the moved data in response to a synchronization request, wherein the synchronization component uses the timestamps to generate logical creation and update versions for use in a synchronization message to be sent to a second data replica such that:

upon determining that the moved data has a move in timestamp, the synchronization component derives a logical creation version using both a timestamp generated when the moved data was created in the data store and the move in timestamp, and upon determining that the moved data has a move out timestamp, the synchronization component derives an update version using both the last update version on the data store and the move out timestamp; and an order component that determines that data that is moved into the synchronization scope is a child to other data that is also moved into the synchronization scope at a later time such that the child data has a logical creation version that is lower than the logical creation version of the other data, and in response, adds a unique identifier to the logical creation version of the child data so that the logical creation version of the child is greater than the logical creation version of the other data.

2. The system of claim 1, the moved data includes hierarchically related data.

3. The system of claim 1, the moved data is identified in the move log by path handles.

4. The system of claim 1, wherein the moved data is further identified in the move log with a status indicator that indicates whether the moved data is valid.

5. The system of claim 1, the log component updates the move log with an intra-scope move path.

6. The system of claim 1, the log component writes a specific value to a status indicator to demonstrate that the moved data has been removed from the synchronization scope that was previously placed within the scope.

7. The system of claim 1, the input component includes a monitor component that manages the synchronization scope and provides move data to the log component upon detection of the move.

8. The system of claim 1, further comprising a query component that processes one or more requests for information from the move log.

9. A computer-implemented method of processing data moves for synchronizing two or more replicas comprising:
- receiving information pertaining to a movement of data in the form of a unit or a collection thereof into, out of, or within a synchronization scope of a data store;
- updating a computer-readable move log with information identifying the moved data and a time of the move, wherein the information includes a move in timestamp for the moved data if the data is moved in to the synchronization scope, or includes a move out timestamp for the moved data if the data is moved out of the synchronization scope; and
- synchronizing data stores of two or more processor-based devices, as a function of the information captured by the move log, wherein the data to be synchronized is identified using the timestamps to generate logical creation and update versions for use in a synchronization message to be sent to a second data replica such that:
  - upon determining that the moved data has a move in timestamp, a synchronization component derives a logical creation version using both a timestamp generated when the moved data was created in the data store and the move in timestamp, wherein upon determining that the logical creation version of the moved data is less than the logical creation version of other data that is a parent of the moved data, an order component modifies the logical creation version of the moved data by adding a unique identifier so that the logical creation version of the moved data is greater than the logical creation version of the parent data, and
  - upon determining that the moved data has a move out timestamp, the synchronization component derives an update version using both the last update version on the data store and the move out timestamp.

10. The method of claim 9, updating the move log further comprising inserting a path and a path limit associated with a group of hierarchical data moved into the synchronization scope.

11. The method of claim 9, updating the move log further comprises specifying a type of data moved into the synchronization scope.

12. The method of claim 9, updating the move log further comprises specifying at least one parameter related to moving data out of the synchronization scope.

13. The method of claim 9, updating the move log further comprises writing a status bit to indicate that data has been removed from the synchronization scope.

14. The method of claim 9, updating the move log further comprises updating at least one path to reflect movement of data within the synchronization scope.

15. The method of claim 9, further comprising querying the move log to retrieve the logical creation version or the update version of the moved data.

* * * * *

UNITED STATES PATENT AND TRADEMARK OFFICE
CERTIFICATE OF CORRECTION

| | | |
|---|---|---|
| PATENT NO. | : 7,761,412 B2 | |
| APPLICATION NO. | : 11/112799 | |
| DATED | : July 20, 2010 | |
| INVENTOR(S) | : Tomas Talius et al. | |

It is certified that error appears in the above-identified patent and that said Letters Patent is hereby corrected as shown below:

In column 7, line 1, after "move" insert -- in --.

Signed and Sealed this
Eighth Day of February, 2011

David J. Kappos
*Director of the United States Patent and Trademark Office*